(12) United States Patent
Petrak

(10) Patent No.: US 6,743,393 B1
(45) Date of Patent: Jun. 1, 2004

(54) METHOD FOR PRODUCING CERAMIC MATRIX COMPOSITES

(75) Inventor: Daniel Ralph Petrak, Sanford, MI (US)

(73) Assignee: Coi Ceramics, Inc., San Diego, CA (US)

( * ) Notice: Subject to any disclaimer, the term of this patent is extended or adjusted under 35 U.S.C. 154(b) by 438 days.

(21) Appl. No.: 09/098,822

(22) Filed: Jun. 17, 1998

(51) Int. Cl.[7] .................................................. B28B 1/30
(52) U.S. Cl. ........................ 264/625; 264/624; 264/626; 264/640
(58) Field of Search ................................ 264/624, 625, 264/626, 640

(56) References Cited

U.S. PATENT DOCUMENTS

| | | | |
|---|---|---|---|
| 4,460,638 A | 7/1984 | Haluska | 428/224 |
| 4,460,639 A | 7/1984 | Chi et al. | 428/224 |
| 4,642,271 A | 2/1987 | Rice | 428/698 |
| 5,067,999 A | 11/1991 | Streckert et al. | 156/89 |
| 5,071,600 A | 12/1991 | Deleeuw et al. | 264/22 |
| 5,145,812 A | 9/1992 | Arai et al. | 501/97 |
| 5,167,881 A | 12/1992 | Atwell et al. | 264/22 |
| 5,202,059 A | 4/1993 | Kennedy | 2525/389.31 |
| 5,268,336 A | 12/1993 | Delecuw et al. | 501/88 |
| 5,318,930 A | 6/1994 | Leung et al. | 501/32 |
| 5,366,943 A | 11/1994 | Lipowitz et al. | 501/95 |
| 5,593,728 A * | 1/1997 | Moore et al. | 501/95 |
| 5,707,471 A | 1/1998 | Petrak et al. | 156/89 |
| 5,725,828 A | 3/1998 | Zank | 264/625 |

\* cited by examiner

*Primary Examiner*—Christopher A. Fiorilla
(74) *Attorney, Agent, or Firm*—Coi Ceramics, Inc.

(57) ABSTRACT

A method for producing ceramic matrix composites wherein the method has the steps of impregnating crystalline silicon carbide fibers coated with an interfacial coating with a ceramic matrix precursor; forming the impregnated fibers into the desired shape; curing the shape; and heating the cured shape to a temperature in the range of greater than 1450° C. to 1800° C. to convert the ceramic matrix precursor into a crystal containing ceramic. A densification step may be optionally carried out until the desired porosity/density of the ceramic matrix composite is achieved.

19 Claims, No Drawings

METHOD FOR PRODUCING CERAMIC MATRIX COMPOSITES

The U.S. Government has a paid-up license in this invention and the right in limited circumstances to require the patent owner to license others on reasonable terms as provided for by the terms of DE-FC02-92CE40993 awarded by DOE.

FIELD OF THE INVENTION

This invention pertains to a ceramic matrix composite and a method for preparing the ceramic matrix composite. The ceramic matrix composite comprises a crystalline silicon carbide fiber coated with an interfacial coating in a matrix produced by polymer impregnation. The presence of the crystalline silicon fiber in the matrix allows the matrix to be formed using higher pyrolysis temperatures thereby resulting in a matrix with improved mechanical properties and corrosion resistance.

BACKGROUND OF THE INVENTION

Ceramic matrix composites and methods for their production are will known in the art. One such method for producing the composites is a polymer infiltration process wherein ceramic fibers, typically coated with an interfacial coating, are impregnated with a ceramic matrix precursor. The impregnated fibers are then formed into the desired shape and cured. The cured shape is then heated to a temperature of about 800° C. to 1300° C. for a time effective to convert the ceramic matrix precursor into a ceramic. If desired, the composites can be reimpregnated with the ceramic matrix precursor one or more times until the desire porosity of the matrix is achieved.

The temperature at which the molded part is heated to convert the ceramic matrix precursor to the ceramic ("pyrolysis" or "ceramification" temperature) has in the past been limited to about 1300° C. Heating to higher temperatures is desired because crystallization of the matrix phase will occur and thus result in an improved composite. However, heating to a higher pyrolysis temperature causes shrinkage and a loss of mechanical properties due to degradation of the fiber in the matrix.

For example, U.S. Pat. No. 4,460,638 to Haluska discloses a method of making a CMC using a ceramic fiber and a silazane polymer. The polymer is ceramified at a temperature of at least 1000° C, preferably at 1200° C. U.S. Pat. No. 4,460,639 to Chi et al. discloses a method of making a CMC using a ceramic fiber and organopolysiloxane resins. The polymer is ceramified at a temperature of at least 1 000° C., preferably at 1200° C. U.S. Pat. No. 4,642,271 to Rice discloses a method of making a CMC using a ceramic fiber coated with BN in a SiC polymer based matrix. The polymer pyrolysis is carried out at a temperature of about 1000° C. U.S. Pat. No. 5,067,999 to Streckert et al. discloses a method of making a CMC using a carbon based fiber cloth coated with a boron bonding agent and a polysilane. The polysilane is ceramified at a temperature of 700° C. to 1000° C. U.S. Pat. No. 5,318,930 to Leung et al. discloses a method of making a CMC using a ceramic fiber and cyclosiloxane monomers containing a vinyl group and/or hydride group. The ceramification is carried out at a temperature of 800° C. to 1400° C. U.S. Pat. No. 5,725,828 discloses a method for producing a CMC from a modified hydrogen silsesquioxane resin and a coated ceramic fiber. The polymer ceramification is carried out at a temperature of at least 1000° C., preferably at 1200° C. U.S. Pat. No. 5,707,471 to Petrak et al discloses a method for making a CMC using a coated ceramic fiber and a curable preceramic polymer. The polymer ceramification is carried out at a temperature of at least 1000° C., preferably 1200° C. None of these references teach pyrolysis of the polymer at a temperature of greater than 1450° C.

U.S. Pat. No. 5,145,812 to Arai et al. discloses a method of forming a molded body of silicon-nitride based ceramic by hot pressing at a temperature of 700° C. to 2500° C. Arai et al. does not teach the use of crystalline silicon carbide fibers or the formation of the composites by polymer impregnation.

It has now been found when a crystalline silicon carbide fiber is incorporated into the matrix composite, that the preceramic polymer matrix may be processed to a ceramic at a higher temperature causing crystallization of the matrix phase. The result is a ceramic matrix composite that has improved mechanical properties and corrosion resistance.

It is therefore an object of this invention to provide a method for producing ceramic matrix composites comprising a crystalline silicon carbide fiber coated with an interfacial coating in a crystal containing ceramic matrix that has improved mechanical properties and corrosion resistance.

SUMMARY OF THE INVENTION

This invention pertains to a method for producing ceramic matrix composites comprising impregnating crystalline silicon carbide fibers coated with an interfacial coating with a ceramic matrix precursor comprising a curable silicon-containing preceramic polymer; forming the impregnated fibers into the desired shape; curing the shape; and thereafter heating the cured shape to a temperature of greater than 1450° C to 1800° C. for a time effective to convert the ceramic matrix precursor into a crystal containing ceramic. A densification step comprised of reimpregnation and ceramification may be optionally carried out one or more times until the desired porosity/density of the ceramic matrix composite is achieved.

DETAILED DESCRIPTION OF THE INVENTION

This invention pertains to a method for forming a ceramic matrix composite. The ceramic matrix composite comprises a crystalline silicon carbide fiber having an interfacial coating thereon in a crystal containing ceramic matrix. The crystal containing ceramic matrix is produced from a ceramic matrix precursor comprising a curable silicon-containing preceramic polymer that is heated to a temperature of greater than 1450° C. to produce the ceramic matrix. The ceramic matrix is comprised of crystalline SiC and optionally crystalline $Si_3N_4$.

Crystalline silicon carbide fibers are known in the art and methods for producing the fibers are known in the art. By "crystalline silicon carbide fiber" it is meant a silicon carbide fiber having at least 75% crystallinity with a small average crystallite size (e.g. less than about 1 micron). Preferably the crystalline silicon carbide fibers useful herein have the approximate stoichiometry of SiCO where the amount of oxygen in the fiber is 2 wt % or less, preferably 0.5 wt % or less, more preferably 0.1 wt % or less. The silicon and carbon are present in the fiber in approximately stoichiometric amounts. The crystalline silicon carbide fibers may contain other optional elements such as nitrogen, titanium, zirconium, boron, aluminum or any other element which does not affect the integrity of the resulting fiber. Commercially available crystalline silicon carbide fibers include Hi-Nicalon™ silicon carbide fibers sold by Nippon Carbon Co., Ltd and Sylramic™ SiC fibers produced by Dow Corning, Corp.

Methods are known in the art for producing the crystalline silicon carbide fibers. For example, U.S. Pat. Nos. 5,071,600 to Deleeuw et al; 5,167,881 to Atwell et al.; 5,268,336 to Deleeuw et al. and 5,366,943 to Lipowitz et al. teach methods for making crystalline silicon carbide fibers, herein incorporated by reference for their teaching of how to produce crystalline silicon carbide fibers.

The crystalline silicon carbide fibers are coated with an interfacial coating. Any interfacial coating that allows the fiber to debond from the matrix and deflect cracks under stress such that the composite does not undergo catastrophic failure are useful herein. The interfacial coating may be exemplified by, but not limited to coatings of carbon, boron nitride, silicon carbide, silicon nitride, aluminum nitride, and combinations of the above, preferably boron nitride. The coating and methods for their application are known in the art. For example, U.S. Pat. No. 5,707,471 to Petrak et al., issued Jan. 13, 1998, discloses fibers coated with interfacial coatings, herein incorporated by reference for its teaching of interfacial coatings. U.S. Pat. No. 5,202,059 to Kennedy discloses a filler material, such as a fiber, having a duplex coating thereon, herein incorporated by reference for its teaching of interfacial coatings.

The interfacial coatings are generally used in thicknesses that allow the fibers to debond and pullout under stress. Although the coating thickness is dependent on the coating quality, typical thicknesses are generally in the range of 0.01 to 1 micron, preferably 0.05 to 0.5 micron.

Preferably the crystalline silicon carbide fibers have a diameter of 5 micrometers to 500 micrometers, more preferably 8 micrometers to 15 micrometers. The modulus of the fiber should be greater than 300 GPa, preferably greater than 345 GPa. The crystalline silicon carbide fibers having the interfacial coating thereon may be used in nearly any length and may be arranged in the matrix in nearly any manner desired. Generally, the fibers are essentially continuous or aligned unidirectionally, woven as 2-dimensional fabric or shaped as a 3-dimensional reinforced preform.

The volume percentage of fibers in the ceramic matrix composite can vary over a wide range depending on the desired use of the ceramic matrix composite. Preferably, the volume percentage of fibers in the ceramic matrix composite is about 10 to 65 volume percent, more preferably 40 to 50 volume percent.

The crystal containing ceramic matrix is produced from a ceramic matrix precursor comprising a curable silicon-containing preceramic polymer. Curable silicon-containing preceramic polymers useful herein are known in the art and include polysilazanes, polycarbosilanes, polysiloxanes, polysilsesquioxanes and polysilanes, preferably polysilazanes. Useful curable silicon-containing preceramic polymers are described in U.S. Pat. No. 5,707,471 to Petrak et al., issued Jan. 13, 1998, herein incorporated by reference for its teaching of curable silicon-containing preceramic polymers. Ceramic matrixes comprised of crystalline silicon carbide (SiC) and crystalline silicon nitride ($Si_3N_4$) are produced when starting with ceramic matrix precursor comprising a polysilazane. Ceramic matrixes comprised of crystalline silicon carbide (SiC) are produced when starting with a ceramic matrix precursor comprising polycarbosilanes, polysiloxanes, polysilsesquioxanes and polysilanes. By "crystal containing" it is meant that the matrix is comprised of phases of beta silicon carbide and optionally beta silicon nitride wherein said phases are not the result of any fillers in the ceramic matrix precursor.

Preferably the ceramic matrix precursor comprises a polysilazane such as hydridosilazanes (e.g. HPZ), vinyl modified polysilazanes, silacyclobutasilazanes, vinyl modified poly(disilyl)silazanes, borosilazanes, boron modified hyrdopolysilazanes (e.g. boroHPZ) and vinyl-modified hydridopolysilazanes.

The ceramic matrix precursor may optionally contain a filler. Fillers are typically used to decrease the amount of matrix shrinkage which occurs on pyrolysis so that the resultant composites have lower porosity. Suitable fillers are known in the art and can include, for example, powders, whiskers or particulates of silicon dioxide (e.g. $SiO_2$), metal oxides (e.g., $Al_2O_3$), silicon carbide, silicon nitride, silicon hexaboride, aluminum nitride, boron nitride, and others, preferably silicon nitride. Such fillers are generally included in amounts up to about 80 wt %, preferably 20 to 60 wt %, based on the weight of the ceramic matrix precursor.

The composites herein are produced by a method known in the art as polymer impregnation. This process comprises first impregnating the ceramic fibers coated with an interfacial coating with the ceramic matrix precursor. The ceramic matrix precursor is applied to the fibers as a liquid either by forming a solution of the ceramic matrix precursor (solution route) or by melting the ceramic matrix precursor (melt route).

In the solution route, the curable silicon-containing preceramic polymer and optional filler are mixed with an organic solvent. Solvents useful herein are those with a low vaporization point (e.g. <125° C.) at atmospheric pressure and those with less than 1% by weight of water. Examples of suitable organic solvents include aliphatic hydrocarbons such as hexane, heptane and others; and aromatic hydrocarbons such as benzene, toluene and others. Typically the solvent is present in an amount of 30 to 70 wt % of the ceramic matrix precursor.

The concentration of the curable silicon-containing preceramic polymer in solution can be varied over a wide range with higher concentrations generally resulting in larger amounts of the polymer impregnating the fiber. Preferably, concentrations of silicon-containing preceramic polymer range in the amount of about 20 to 80 weight percent based on the weight of the ceramic matrix precursor.

In the melt route, the curable silicon-containing preceramic polymer is heated to a temperature greater than its melting point but less than its curing temperature in an inert environment to form the liquid. The optional fillers may then be blended into the molten polymer.

The fibers are then impregnated with the liquid ceramic matrix precursor by any known means. For example, the fibers may be immersed in the liquid ceramic matrix precursor, sprayed with the liquid ceramic matrix precursor, held under a stream of the liquid ceramic matrix precursor and others. When the melt route is used methods such as filament winding or pulltrusion may be used to impregnate the fibers with the ceramic matrix precursor. The impregnated fibers can also be manipulated to ensure a uniform distribution of the liquid ceramic matrix precursor into the fibers.

Following impregnation, any excess liquid ceramic matrix precursor on the fibers is allowed to drain off. If the solution route is used the solvent is removed from the liquid ceramic matrix precursor. Any method for removal of solvent is useful such as the use of vacuum or mild heat to evaporate the solvent. If the melt route is used the liquid ceramic matrix precursor is cooled to a temperature below the melting point of the silicon- containing preceramic polymer. The resultant fibers impregnated with the ceramic matrix precursor are commonly known as a "pre-preg".

The pre-preg may then optionally be partially cured so that they will hold the desired shape. This partial curing (i.e. "B-staging") is generally accomplished by heating in air or inert gas at a temperature in the range of 50° C. to 150° C. for about 2 minutes to 4 hours. Typically, heating at a temperature of 100° C. for 10 to 15 minutes is sufficient. This heating may be carried out by any means such as by an air convection oven or similar means. Care should be taken during B-staging to ensure that over curing of the pre-preg does not result. Over curing of the pre-preg results in reduction of the flowability of the ceramic matrix precursor in the later shaping step.

The pre-preg is then formed into the desired shape and the resin uniformly distributed about the fibers by the application of pressure and heat. Typically this is accomplished by placing the pre-preg in a mold of the desired shape and applying a pressure at a temperature that allows the ceramic matrix precursor to flow throughout the mold. Pressures in the range of 6.9 kPa to 6900 kPa (1 to 1000 psi), preferably 690 kPa to 2070 kPa (100 to 300 psi) and temperatures in the range of 150° C. to 600° C., are useful herein for producing the shaped pre-preg. Typically the pre-preg will be pressed for a time of 2 minutes to 8 hours, preferably 4 to 6 hours. Pressures and temperatures that result in the ceramic matrix precursor being forced out the mold should be avoided.

The shaped impregnated fibers ("shaped pre-preg") is then cured (infusibilized) to ensure that there will be essentially no deformation upon ceramification. Curing results in the silicon-containing preceramic polymer being essentially crosslinked. Any method which cures the pre-preg may be used. Typically, the shaped pre-preg is cured by heating for a time sufficient to result in essentially complete cure ("cure time") to a temperature greater than the cure temperature but less than the ceramification temperature of the silicon-containing preceramic polymer ("cure temperature"). The cure time and cure temperature will vary depending on the silicon-containing preceramic polymer being employed. Preferably, the shaped pre-preg is cured by heating to a temperature of less than 300° C., preferably about 250° C. to 390° C. for a period of up to 16 hours. The curing step may be carried out in the mold under pressure or it may be accomplished by conventional means such as heating in an oven under nitrogen without the application of pressure.

The cured shape ("green composite" or "molded part") is then slowly fired at temperature of greater than 1450° C. to 1800° C. in an inert atmosphere to cause ceramification of the silicon-containing preceramic polymer. Heating at temperatures of less than 1450° C. does not produce matrices that are crystal containing. It is preferred that the cured shape be heated to a temperature of 1500° C. to 1600° C. for ceramification. By "slow firing" it is meant that the composites are heated in a slow (e.g. 5° C./min) stepwise or linear fashion up to ceramification temperature (i.e. >1450° C. to 1800° C.). The cured shape is held at the ceramification temperature for a time sufficient to ensure complete ceramification, preferably 2 to 6 hours. The time that the cured shape is held is a function of the ceramic matrix composite being formed and can be readily determined by one skilled in the art.

After completion of the ceramification the composite is cooled. At least the initial cooling should be under an inert atmosphere.

The ceramic matrix composites produced by the above process steps are generally porous. Since dense ceramic matrix composites are typically preferred, the ceramic matrix composites may be densified by re-impregnating the composite with the ceramic matrix precursor, excluding any fillers; curing the re-impregnated composite and ceramifying the silicon-containing polymer. The ceramification during this densification step can take place at a temperature less than the temperature used in the initial ceramification, preferably at a temperature of 1000° C. to 1300° C. This step of reimpregnation can be carried out one or more times until the desired density and strength of the ceramic matrix composite is achieved. Because this densification step is carried out at a lower temperature, an amorphous phase is introduced into the matrix.

When the desired ceramic matrix composite is a 3-dimensional shape, the above step of producing the ceramic matrix composite are often altered. Typically, the fiber is first formed into the desired 3-dimensional shape and then impregnated with the ceramic matrix precursor. The impregnated fibers are then pressed, cured, ceramified and optionally densified as described herein.

The use of a ceramification temperature of greater than 1450° C. to 1800° C. results in the formation of a crystalline ceramic matrix. When polysilazane is the silicon-containing preceramic polymer the matrix will be comprised of crystalline silicon carbide (SiC) and crystalline silicon nitride ($Si_3N_4$). When polycarbosilanes, polysiloxanes, polysilsesquioxanes and polysilanes are the silicon-containing preceramic polymer the matrix will be comprised of crystalline silicon carbide (SiC). It is theorized that this crystalline structure in the ceramic matrix results in the improved mechanical properties and corrosion resistance of the ceramic matrix composites.

EXAMPLES

So that those skilled in the art can understand and appreciate the invention taught herein, the following examples are presented, it being understood that these examples should not be used to limit the scope of this invention found in the claims.

Matrix Precursor Formulation

The matrix precursor was prepared by mixing a $Si_3N_4$ powder having an average particle size of less than 1 micron purchased from Ube type, SN-E10 (40 wt % of the matrix precursor) with a vinyl hydridopolysilazane polymer (Vi-HPZ) (60 wt % of matrix precursor) in xylene. Mixing of the matrix slurry was done by ball milling the total mixture for 16 hours in a plastic jar with 6.35mm diameter SiC balls. The plastic jar was 500 cm volume and 200g of SiC balls were used during the mixing operation. The total weight of the slurry produced was 160g.

Prepreg Preparation

A 35×70 cm cloth of boron nitride (BN) coated ceramic fiber (see Table 1) was used in the ceramic matrix composite preparation. The prepreg was formed by pouring the matrix precursor over the coated cloth and gently rubbing the matrix precursor into the woven cloth to assure penetration of the matrix precursor into the fiber tows. The saturated cloth was then run through a set of metal rolls to remove excess matrix precursor. The piece of cloth was then placed on a metal mesh and placed in a hood to evaporate the toluene solvent for approximately 1 hour to produce a prepreg that was drapeable and slightly tacky. At that stage, the solids content of the matrix precursor was 40 to 50% of the weight of the prepreg total.

Composite Molding Procedure

The prepreg cloth was cut into approximately eight 16.5 cm ×16.5 cm pieces (plies) using a razor knife. The plies were stacked as warp direction aligned symmetrical eight ply composites in the case of woven cloth composites.

Once the prepreg plies were assembled they were ready for vacuum bagging. This consisted of an aluminum plate 30 cm ×50 cm, one layer of peel ply, the stack of prepreg plies, another peel ply, two layers of bleeder cloth and a sheet of Vac-Pac UHT-650-XT bonded to the larger aluminum plate using a high temperature tape (Schnee-Morehead 5158). A vacuum port was introduced through the Vac-Pac sheet.

Molding was done by placing the cull plate and vacuum bag in an autoclave. The temperature and pressure schedules for molding the silazane matrix composite in an autoclave was:

| Time H:Min | Temperature, ° C. | Pressure, MPa |
|---|---|---|
| 0:00 | 20 | 0.021 |
| 0:35 | 90 | 0.021 |
| 2:35 | 90 | 0.020 |
| 2:45 | 90 | 0.069 |
| 4:45 | 90 | 0.069 |
| 5:05 | 120 | 0.100 |
| 5:45 | 235 | 0.100 |
| 11:45 | 235 | 0.100 |
| 13:30 | 40 | 0.100 |
| 13:40 | 40 | 0.0 |

The composites were then weighed and checked for dimensions. A 20 hour post-cure cycle was completed by heating to 400° C. in a nitrogen atmosphere.

Pyrolysis and Composite Densification

The post-cured composite panels were heated in a furnace with a nitrogen atmosphere to between 1200° C. to 1700° C. (see table 2) at 100° C. per hour. The temperature was held for two hours. After cooling to less than 100° C. the panels were removed and inspected. Typically, the panels would not change dimensions but the composite would loose approximately 7% of its weight after pyrolysis to 1200° C.

That weight loss produced approximately 30% open porosity in the pyrolyzed composite. In order to reduce the open porosity, the composite panels were then impregnated with a 50 wt % solution of VI-HPZ polymer in toluene. The impregnation was done at room temperature by placing the panel in an evacuated chamber and introducing the Vi-HPZ solution. Once the part was submerged in the solution, the vacuum was released and the chamber pressure was raised to ambient pressure.

The panels were permitted to remain in the solution for 30 minutes; then they were removed from the solution and placed in an exhaust hood to evaporate the toluene solvent for at least one hour. After the solvent was removed the panel was heated to 1200° C. in flowing nitrogen using the same heating schedule described above. This reimpregnation and pyrolysis cycle was repeated until the composites showed an open porosity level that was measured to be 6% or less using a liquid emulsion method.

After 12 pyrolysis cycles to 1200° C. the 6% open porosity composite was pyrolyzed to 1500° C. in a nitrogen atmosphere for 4 hours. This higher pyrolysis temperature increased the open porosity to 12%. The composite was then subjected to four more impregnation and pyrolysis cycles which reduced porosity to less than 6 % open porosity.

Mechanical Testing

A comparison of mechanical properties of composites made using three different fiber reinforcements is shown in Table 2. All of the composites were prepared by the PIP method using a silazane matrix precursor. All of these composites have good mechanical properties when tested at ambient conditions. If the CG NICALON reinforced composite were processed to 1500° C. for 4 hours, as the SYLRAMIC fiber composite was, the strength would be severely degraded and the strain-to-failure would be substantially reduced. Table 4 also shows that processing of the SYLRAMIC SiC reinforced composite to as high as 1700° C. still produces material with good tensile properties.

Table 3 demonstrates the thermal and mechanical property differences when specimens from the same composite panels were processed to 1300° C. and 1500° C. Because processing of the composite to 1500° C. produces a crystalline matrix phase the thermal conductivity of the composite is 10 to 20 percent higher in the in-plane direction, i.e. parallel to the fibers. This behavior is desirable because it tends to reduce thermal stress compared to a low thermal conductivity material. Table 3 also compares the strain rate and total strain in specimens subjected to a tensile creep test at 1315° C. and 70 MPa. The 1500° C. processed material demonstrated both a lower creep rate and lower total strain to failure because the matrix was crystallized during the higher temperature processing.

Tensile fatigue tests were also run on the same lot of specimens in which some were processed to 1300° C. and some to 1500° C. The material processed to 1500° C. did not fail when cycled between a tensile load of 138 Mpa and 13.8 Mpa for 1,000,000 cycles where as the material processed to 1300° C. failed after 352,105 cycles under the same conditions. These data show that the 1500° C. processed composite is more useful as a structural material than the 1300° C. processed material.

TABLE 1

Ceramic Fiber

| Fiber Type | Amt. Oxygen in fiber wt %) | Diameter (micrometers) | Modulus GPa | Interfacial Coating Thickness (micrometers) | Cloth Type |
|---|---|---|---|---|---|
| GC Nicalon ® | 11 | 15 | 193 | 0.5 | 8 harness satin weave |
| Hi-Nicalon ™ | 0.5 | 14 | 302 | 0.5 | 8 harness satin weave |
| Sylramic ™ SiC | <0.5 | 10 | 380 | 0.5 | 5 harness satin weave |

TABLE 2

Mechanical properties of various ceramic matrix composites.

| Fiber | Ceramification Temperature | Tensile Strength (MPa) | Ultimate Strain (%) | Youngs Modulus (GPa) | PR Limit (MPa) |
|---|---|---|---|---|---|
| GC Nicalon ™ | 1200° C. | 276.0 | 0.5 | 96.6 | 82.8 |
| Hi-Nicalon ™ | 1300° C. | 355.4 | 0.5 | 110.4 | 69.0 |
| Hi Nicalon ™ | 1500° C. | 298.8 | 0.46 | 78.7 | 53.8 |
| Sylramic ™ SiC | 1300° C. | 353.3 | 0.33 | 141.4 | 125.6 |
| | 1300° C. | 434.7 | 0.44 | 144.9 | 115.2 |
| | 1300° C. | 412.6 | 0.4 | 151.8 | 143.5 |
| Sylramic ™ SiC | 1500° C. | 459.5 | 0.45 | 137.3 | 120.8 |
| | 1500° C. | 465.8 | 0.41 | 144.9 | 114.5 |
| | 1500° C. | 478.9 | 0.43 | 158.0 | 155.9 |

TABLE 4

Tensile Properties for CMCs process to various temperatures, tested at room temperature

| Ceramification Temperature | Young's Modulus (GPa) | Proportional Limits (MPa) | Ultimate Strength (MPa) | Strain to Failure (%) |
|---|---|---|---|---|
| 1300° C. | 151.1 | 128.3 | 362.2 | 0.34 |
| 1500° C. | 159.4 | 139.4 | 374.7 | 0.34 |
| 1600° C. | 176.0 | 114.5 | 320.2 | 0.26 |
| 1700° C. | 147.0 | 127.6 | 251.2 | 0.22 |

TABLE 3

Mechanic properties of composites comprising crystalline SiC fibers.

| | In Plane Direction | | | Tensile Creep at 1315° C. and 70 MPa | | Tensile Fatigue at 1200° C. | | | |
|---|---|---|---|---|---|---|---|---|---|
| | Thermal Conductivity (Watt/meter ° K.) | | | Strain Rate after 200 h | Total Strain after 200 h | | | | |
| Ceramification Temperature | 200° C. | 400° C. | 650° C. | $(S^{-1})$ | (%) | 120.8 MPa | 138.0 MPa | 155.2 MPa | 172.5 MPa |
| 1300° C. | 9.23 | 8.97 | 8.78 | $1.7 \times 10^{-8}$ | 1.60 | $>1 \times 10^6$ | 352, 105 | | |
| 1500° C. | 11.13 | 10.47 | 9.92 | $1.2 \times 10^{-8}$ | 1.23 | | $>1 \times 10^6$ | 482, 430 | 68, 159 |

What is claimed is:

1. A method for producing ceramic matrix composites comprising
   impregnating crystalline silicon carbide fibers containing less than 2 wt % oxygen and coated with an interfacial coating with a ceramic matrix precursor comprising a curable silicon-containing preceramic polymer;
   forming the impregnated fibers into the desired shape;
   curing the shape;
   and thereafter heating the cured shape to a temperature in the range of greater than 1450° C. to 1800° C. for a time effective to convert the ceramic matrix precursor into a crystal containing ceramic.

2. The method as claimed in claim 1 wherein the crystalline ceramic fiber contains ≤0.5 wt % oxygen.

3. The method as claimed in claim 1 wherein the interfacial coating is selected from the group consisting of carbon, boron nitride, silicon carbide, silicon nitride, aluminum nitride and combinations thereof.

4. The method as claimed in claim 1 wherein the ceramic matrix precursor additionally contains a filler.

5. The method as claimed in claim 4 wherein the filler is selected from the group consisting of silicon dioxide, metal oxides, silicon carbide, silicon nitride, silicon hexaboride, aluminum nitride, and boron nitride.

6. The method as claimed in claim 4 wherein the ceramic matrix precursor contains 20 to 80wt % filler, based on the weight of the ceramic matrix precursor.

7. The method as claimed in claim 1 wherein the ceramic matrix precursor additionally contains an organic solvent and the solvent is removed prior to shaping the impregnated fibers.

8. The method as claimed in claim 7 wherein the organic solvent is selected from the group consisting of aliphatic hydrocarbons and aromatic hydrocarbons.

9. The method as claimed in claim 7 wherein the ceramic matrix precursor contains 20 to 80 wt % curable silicon-containing preceramic polymer, based on the weight of the ceramic matrix precursor.

10. The method as claimed in claim 1 wherein the curable silicon-containing preceramic polymer is selected from the group consisting of polysilazanes, polycarbosilanes, polysiloxanes, polysilsesquioxanes and polysilanes.

11. The method as claimed in claim 10 wherein the curable silicon-containing preceramic polymer is a polysilazane.

12. The method as claimed in claim 11 wherein the polysilazane is selected from the group consisting of hydridosilazanes, vinyl modified polysilazanes, silacyclobutasilazanes, vinyl modified poly(disilyl) silazanes, borosilazanes, boron modified hyrdopolysilazanes, vinyl-modified hydridopolysilazanes.

13. The method as claimed in claim 1 wherein the curable silicon-containing preceramic polymer is melted prior to impregnation of the crystalline silicon carbide fibers and cooled to below its melting point prior to the shaping of the impregnated fibers.

14. The method as claimed in claim 1 wherein the impregnated fibers are partially cured prior to shaping the impregnated fibers.

15. The method as claimed in claim 1 wherein the ceramic matrix precursor is converted into a crystal containing ceramic at a temperature of 1500° C. to 1600° C.

16. The method as claimed in claim 1 wherein the method additionally comprises re-impregnating the ceramic matrix composite with the curable silicon-containing preceramic polymer, curing the curable silicon-containing preceramic polymer and ceramifying the curable silicon-containing preceramic polymer.

17. The method as claimed in claim 16 wherein the steps of re-impregnating, curing and ceramifying are repeated until the desired density is achieved.

18. The method as claimed in claim 17 wherein the crystal containing ceramic is comprised of crystalline $Si_3N_4$ and crystalline SiC.

19. The method as claimed in claim 1 wherein the curable silicon-containing preceramic polymer is selected from the group consisting of polycarbosilanes, polysiloxanes, polysilsesquioxanes and polysilanes and the crystal containing ceramic is comprised of crystalline SiC.

* * * * *